(12) United States Patent
Forsyth et al.

(10) Patent No.: US 10,356,407 B2
(45) Date of Patent: Jul. 16, 2019

(54) DISPLAY-SIDE VIDEO DECOMPRESSION USING QUANTIZATION TABLES

(71) Applicant: Facebook Technologies, LLC, Menlo Park, CA (US)

(72) Inventors: Andrew Thomas Forsyth, Kirkland, WA (US); Lyle David Bainbridge, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 236 days.

(21) Appl. No.: 15/223,823

(22) Filed: Jul. 29, 2016

(65) Prior Publication Data

US 2017/0150147 A1 May 25, 2017

Related U.S. Application Data

(60) Provisional application No. 62/258,417, filed on Nov. 20, 2015.

(51) Int. Cl.
*H04N 19/124* (2014.01)
*G06F 3/01* (2006.01)
*G06T 19/00* (2011.01)
*H04N 19/176* (2014.01)
*H04N 19/51* (2014.01)
*H04N 19/597* (2014.01)

(52) U.S. Cl.
CPC ......... *H04N 19/124* (2014.11); *G06T 19/006* (2013.01); *H04N 19/176* (2014.11); *H04N 19/51* (2014.11); *H04N 19/597* (2014.11)

(58) Field of Classification Search
None
See application file for complete search history.

(56) References Cited

U.S. PATENT DOCUMENTS

| | | | |
|---|---|---|---|
| 2009/0141795 A1* | 6/2009 | Horie | H04N 1/2112 375/240.03 |
| 2011/0051802 A1* | 3/2011 | Van De Waerdt | H04N 19/593 375/240.03 |
| 2014/0006035 A1* | 1/2014 | Takeuchi | G10L 19/008 704/500 |
| 2014/0153822 A1* | 6/2014 | Cheong | H04N 19/50 382/166 |
| 2014/0267636 A1* | 9/2014 | Takagi | G02B 27/0172 348/53 |

(Continued)

*Primary Examiner* — Edemio Navas, Jr.
(74) *Attorney, Agent, or Firm* — Fenwick & West LLP

(57) ABSTRACT

Embodiments relate to a method and a system for performing image compression and decompression of image data. In one or more embodiments, the image data is divided into one or more image data blocks, and the image compression and decompression are performed for each image data block. The image data block is compressed and includes a base value corresponding to a first image component and a compressed difference value corresponding to a second image component. For decompression, a first value of the image data block can be obtained based on the base value, and a second value of the image data block can be obtained based on the first value, the first compressed difference value and a corresponding quantization table. An output image can be presented to a user, according to the decompressed image data block.

21 Claims, 9 Drawing Sheets

(56) References Cited

U.S. PATENT DOCUMENTS

| | | | |
|---|---|---|---|
| 2014/0293096 A1* | 10/2014 | Wang | G06T 5/20 |
| | | | 348/241 |
| 2014/0368412 A1* | 12/2014 | Jacobsen | G02B 27/017 |
| | | | 345/8 |
| 2015/0098499 A1* | 4/2015 | Tominaga | H04N 5/23229 |
| | | | 375/240.02 |
| 2015/0363916 A1* | 12/2015 | Botzas | G06T 3/4015 |
| | | | 382/167 |

* cited by examiner

US 10,356,407 B2

DISPLAY-SIDE VIDEO DECOMPRESSION USING QUANTIZATION TABLES

CROSS-REFERENCE TO RELATED APPLICATION

This application claims priority under 35 U.S.C. § 119(e) from U.S. Provisional Patent Application No. 62/258,417, entitled "Display-Side Video Decompression" filed on Nov. 20, 2015, which is incorporated by reference herein in its entirety.

BACKGROUND

The present disclosure generally relates to presenting virtual/augmented reality and more specifically to video data compression and decompression for presenting virtual/augmented reality.

In virtual reality (VR)/augmented reality (AR) systems, an image of a virtual space is provided to a user. Generally, the VR/AR system includes a source device for generating an image of the virtual space to be presented according to a user's movement, and a sink device for presenting the image updated according to the movement of the user. For example, if a user turns his head to the left, a corresponding image of the virtual image is presented to the user, according to the user motion. However, generating the image according to the user movement involves a complex processing that accompanies with a delay between the user movement and the image presented. In case the user moves faster than the delay associated with presenting the image according to the user movement, the user may perceive a feeling of "lag" or a noticeable delay between the user movement and the image presented. As a result, a VR/AR experience of a user is degraded.

SUMMARY

Embodiments relate to a method and a system for performing image compression and decompression of image data for rendering and display in a VR/AR system. In one or more embodiments, the image data is divided into one or more image data blocks, and the image compression and decompression are performed for each image data block.

In one or more embodiments, compressed image data is presented at a display headset. The display headset includes an electronic display including pixels configured to display image data according to an output image data block, the output image data block comprising a first output value of a first image component and a second output value of a second image component. The display headset further includes a decompression engine communicatively coupled to the electronic display. The decompression engine is configured to (i) receive a compressed data block, the compressed data block including a base value and a first compressed difference value, (ii) obtain the first output value of the first image component based on the base value, (iii) decompress the first compressed difference value based on a quantization table, (iv) obtain the second output value of the second image component by adding the first decompressed difference value to the first output value, and (v) generate the output image data block comprising the first output value of the first image component and the second output value of the second image component.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
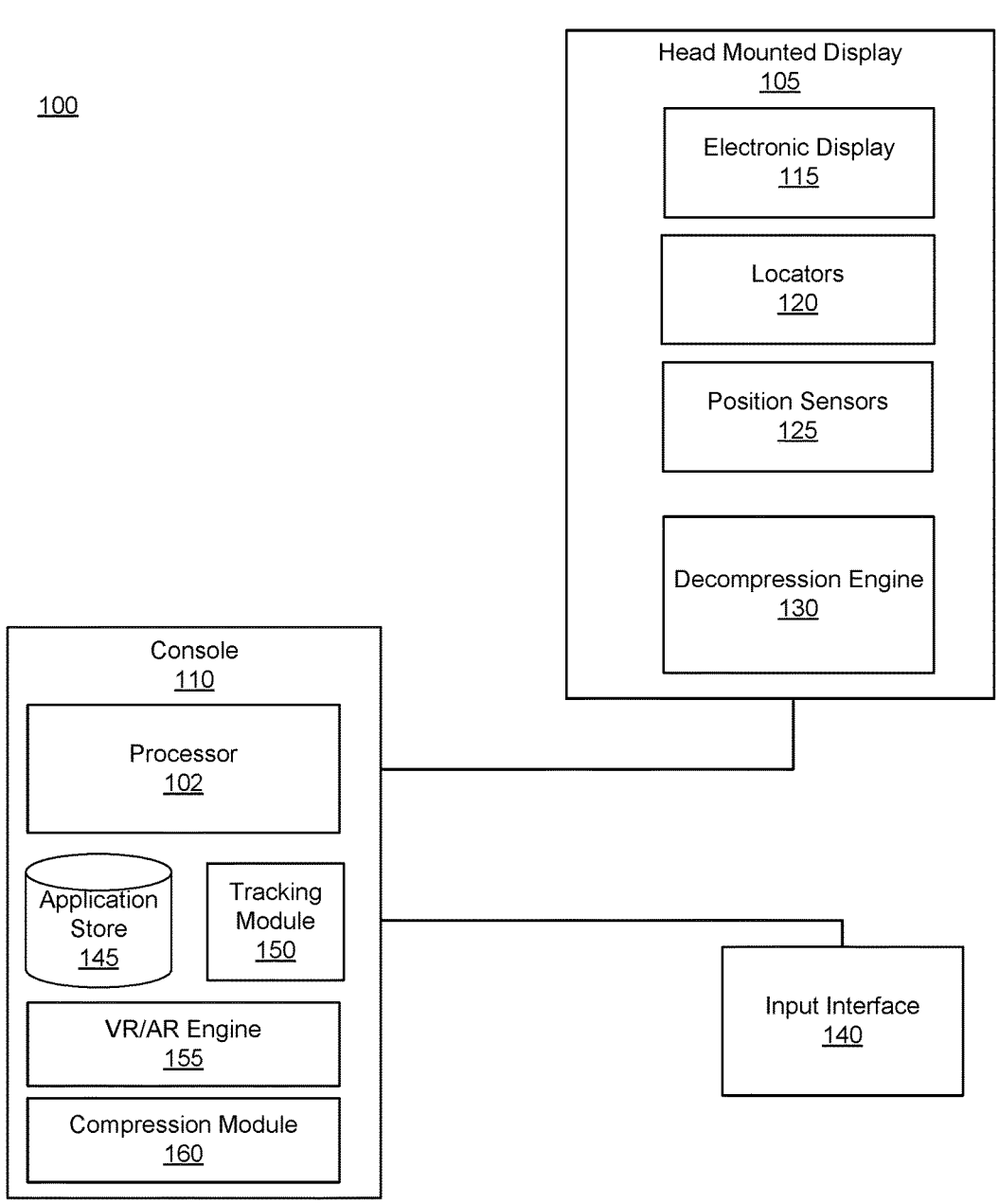
FIG. 1 is a block diagram of a system environment including a virtual reality system, in accordance with an embodiment.

FIG. 1 is a block diagram of a virtual reality (VR)/augmented reality (AR) system 100 in which a console 110 operates. The system 100 shown by FIG. 1 comprises a head mounted display 105, and an input interface 140 that are each coupled to the console 110. In one or more embodiments, the console 110 generates data for presentation and compresses the data in a manner that high quality image data (e.g., 4K or higher resolution) can be transmitted to and presented at the head mounted display 105 within a time period shorter than a duration of transmitting and presenting the high quality image data without performing the disclosed compression. Accordingly, a user can enjoy an immersive VR/AR experience with high quality image data without a noticeable lag.

While FIG. 1 shows an example system 100 including one head mounted display 105 and one input interface 140, in other embodiments any number of these components may be included in the system 100. For example, there may be multiple head mounted displays 105 each having an associated input interface 140, with each head mounted display 105 and input interface 140 communicating with the console 110. In alternative configurations, different and/or additional components may be included in the system 100.

The head mounted display 105 is a head-mounted display that presents media to a user. Examples of media presented by the head mounted display 105 include one or more images, video, audio, or some combination thereof. In some embodiments, audio is presented via an external device (e.g., speakers and/or headphones) that receives audio information from the head mounted display 105, the console 110, or both, and presents audio data based on the audio information. An embodiment of the head mounted display 105 is further described below in conjunction with FIG. 2. The head mounted display 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The head mounted display 105 includes an electronic display 115, one or more locators 120, one or more position sensors 125, and a decompression engine 130. The electronic display 115 displays images to the user in accordance with data received from the console 110. The electronic display 115 may be a LCD, an OLED, an AMOLED, a TOLED, some other display, or some combination thereof.

In some embodiments, images projected by the electronic display 115 are rendered on the sub-pixel level. The red, green, and blue sub-pixels operate together to form different colors. In some embodiments, sub-pixels in the electronic display operate within multiple "logical" pixels in their surrounding vicinity to form different colors. The sub-pixels are arranged on the display area of the electronic display 115 in a sub-pixel array, as further described below with respect to FIG. 2. Examples of a sub-pixel array include PENTILE® RGBG, PENTILE® RGBW, some another suitable arrangement of sub-pixels that renders images at the sub-pixel level.

The locators 120 are objects located in specific positions on the head mounted display 105 relative to one another and relative to a specific reference point on the head mounted display 105. A locator 120 may be a light emitting diode (LED), a corner cube reflector, a reflective marker, a type of light source that contrasts with an environment in which the head mounted display 105 operates, or some combination thereof. In some embodiments, the console 110 can track the position of the locators 120 through an imaging device (not shown for simplicity). Hence, the console 110 can determine positional information of the head mounted display 105. Positional information of the head mounted display 105 herein refers to a position, an orientation, and/or a movement of the head mounted display 105. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the head mounted display 105 includes one or more position sensors 125 to improve accuracy of the measurement of the positional information of the head mounted display 105. A position sensor 125 detects the movement of the head mounted display 105, and generates one or more measurement signals in response to motion of the head mounted display 105. Examples of position sensors 125 include: one or more accelerometers, one or more gyroscopes, one or more magnetometers, another suitable type of sensor that detects motion, or some combination thereof. For example, the position sensors 125 include multiple accelerometers to measure translational motion (forward/back, up/down, left/right) and multiple gyroscopes to measure rotational motion (e.g., pitch, yaw, roll). By use of the measurement signals from the position sensors 125, the accuracy of the measurement of the positional information can be improved compared to an accuracy of the measurement obtained only through tracking the locators 120.

The input interface 140 is a device that allows a user to send action requests to the console 110. An action request is a request to perform a particular action. For example, an action request may be to start or end an application or to perform a particular action within the application. The input interface 140 may include one or more input devices. Example input devices include: a keyboard, a mouse, a game controller, or any other suitable device for receiving action requests and communicating the received action requests to the console 110. An action request received by the input interface 140 is communicated to the console 110, which performs an action corresponding to the action request.

The console 110 provides media to the head mounted display 105 for presentation to the user in accordance with information received from one or more of: the imaging device (not shown), the head mounted display 105, and the input interface 140. In the example shown in FIG. 1, the console 110 includes a processor 102, an application store 145, a tracking module 150, a VR/AR engine 155 and a compression module 160. Some embodiments of the console 110 have different modules than those described in conjunction with FIG. 1. Similarly, the functions further described below may be distributed among components of the console 110 in a different manner than is described here.

The processor 102 is a processing unit that executes instructions. In one embodiment, the processor 102 can be implemented on a reconfigurable hardware (e.g., a field programmable gate array (FPGA)), or one or more application specific integrated circuits (ASICs). The processor 102 executes instructions for performing functions of the console 110 herein. In one embodiment, the processor 102 includes multiple processing units, and multiple instructions can be executed in parallel.

The application store 145 stores one or more applications for execution by the console 110. An application is a group of instructions, that when executed by the processor 102, generates content for presentation to the user. Content generated by an application may be in response to inputs received from the user via movement of the head mounted display 105 or the input interface 140. Examples of applications include: gaming applications, conferencing applications, video playback application, or other suitable applications.

The tracking module 150 determines the positional information of the head mounted display 105, according to the locators 120 and/or the position sensors 125. In one embodiment, the tracking module 150 tracks the locators 120, for example, through an imaging device, and determines current positional information of the head mounted display 105. Similarly, the tracking module 150 determines the current positional information of the head mounted display 105 by analyzing the measurement signals from the position sensors 125. In one embodiment, the tracking module 150 can also predict future positional information of the head mounted display 105 based on prior positional information and the current positional information obtained. The tracking module 150 provides the current or predicted future positional information of the head mounted display 105 to the VR/AR engine 155. The tracking module 150 may be embodied as hardware, software, firmware, or a combination thereof.

The VR/AR engine 155 executes applications within the system 100 and receives positional information of the head mounted display 105 from the tracking module 150. Based on the received information, the VR/AR engine 155 generates content to provide to the head mounted display 105 for presentation to the user. For example, if the received information indicates that the user has looked to the left, the VR/AR engine 155 generates content for the head mounted display 105 that mirrors the user's movement in a virtual environment. Additionally, the VR/AR engine 155 performs an action within an application executing on the console 110 in response to an action request received from the input interface 140 and provides feedback to the user that the action was performed. The provided feedback may be visual or audible feedback via the head mounted display 105 or haptic feedback via the input interface 140. The VR/AR engine 155 transmits the generated content to the head mounted display 105 for presentation of the VR/AR. The VR/AR engine 155 may be embodied as hardware, software, firmware, or a combination thereof.

In one embodiment, the VR/AR engine 155 generates image data for presentation at the head mounted display 105. Image data refers to a group of values corresponding to image components in a color space. For example, the color space can be a RGB color space, where each of red (R), green (G), and blue (B) is an image component of the RGB color space. For another example, the color space can be YCbCr color space, where each of luminance component (Y), blue-difference component (Cb), red-difference component (Cr) is an image component of the YCbCr color space. The VR/AR engine 155 divides the image data into one or more blocks. By dividing the image data into one or more blocks, image compression and decompression can be performed in an efficient manner as further described with respect to FIGS. 4 through 6 below.

The compression module 160 compresses data for transmission to the head mounted display 105. In one embodiment, the compression module 160 receives content (e.g., image, audio, control information, or any combination of them) from the VR/AR engine 155 and compresses the content. The compression module 160 provides the compressed content back to the VR/AR engine 155 for transmission to the head mounted display 105. In one embodiment, the compression module 160 compresses one or more blocks (e.g., image blocks) of the content (e.g., image data), as described in detail with respect to FIGS. 2 through 5 below.

The decompression engine 130 of the head mounted display 105 receives the compressed content from the console 110, and decompresses the compressed content. In one embodiment, the decompression engine 130 decompresses one or more blocks (e.g., compressed image blocks) of the compressed content, as described in detail with respect to FIGS. 6A and 6B below. The decompression engine 130 provides an image portion of the decompressed content to the electronic display 115 for presentation. The decompression engine 130 may also provide audio or other control information to a corresponding component (e.g., speaker) of the head mounted display 105. The decompression engine 130 may be embodied as hardware, software, firmware, or a combination thereof. In some embodiments, the decompression engine 130 is implemented as one or more application specific integrated circuits (ASICs) customized for fast decompression of image data.

Advantageously, by compressing content using the compression module 160 before outputting the compressed content to the head mounted display 105, high quality image data (e.g., 1080P, 4K or higher) at a high frame rate (e.g., 60 fps, 120 fps, or higher) can be transmitted over a bandwidth constrained communicative coupling between the console and head mounted display without significant degradation in the quality of the image presented to the user by the head mounted display. In addition, by compressing the high quality image data, the transmission and presentation of the high quality image data at the head mounted display 105 may be performed within a shorter time period compared to transmission and presentation of image data without compression/decompression. By allowing the transmission of high quality image data in a reduced time period through compression and decompression disclosed herein, a noticeable lag due to a user movement can be eschewed.

Figure 2:
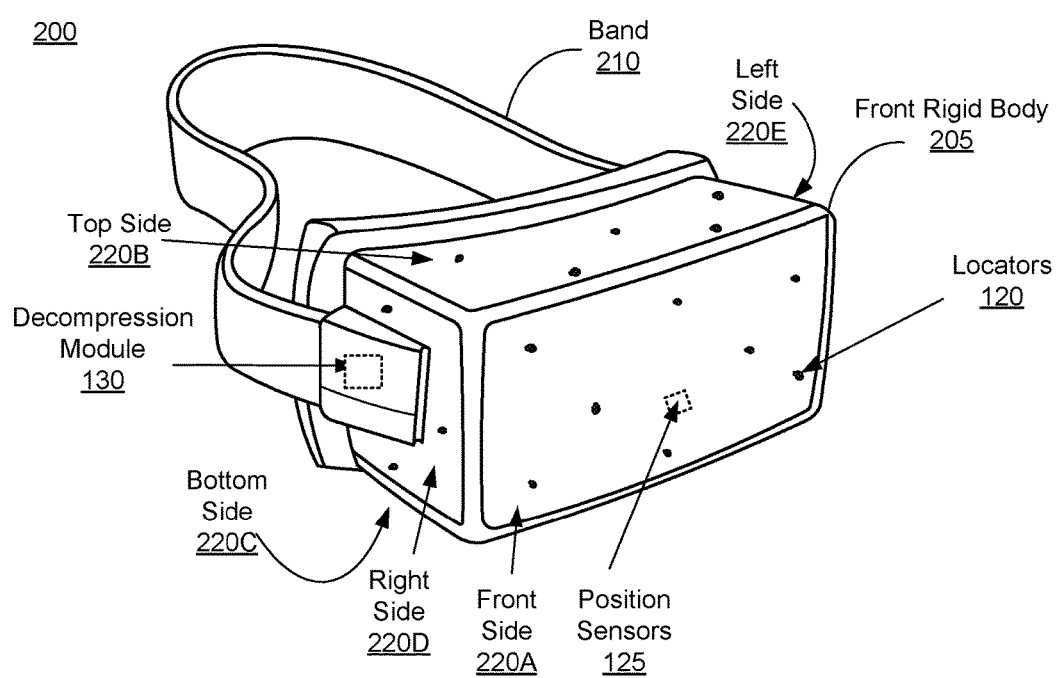
FIG. 2 is a diagram of a virtual reality headset, in accordance with an embodiment.

FIG. 2 is a diagram of a virtual reality (VR) headset, in accordance with an embodiment. The head mounted display 200 is an embodiment of the head mounted display 105, and includes a front rigid body 205 and a band 210. The front rigid body 205 includes the electronic display 115 (not shown in FIG. 2), one or more position sensors 125, the locators 120, and the decompression engine 130.

The locators 120 are located in fixed positions on the front rigid body 205 relative to one another and relative to a reference point. In one example, the reference point is located at a center of the electronic display 115 or the center of the front rigid body 205. Each of the locators 120 emits light that is detectable by the imaging device. Locators 120, or portions of locators 120, are located on a front side 220A, a top side 220B, a bottom side 220C, a right side 220D, and a left side 220E of the front rigid body 205 in the example of FIG. 2.

The position sensors 125 generate one or more measurement signals in response to a movement of the head mounted display 105. In the example shown in FIG. 2, the position sensors 125 are located near a center of the front rigid body 205. The position sensors 125 may be located on a surface of the front rigid body 205 not visible from outside. In other embodiments, the position sensors 125 are located anywhere on the head mounted display 200.

The decompression engine 130 receives compressed content from the console 110 and decompresses the received content. The decompression engine 130 is electronically coupled to the electronic display 115, and provides high quality image data of the decompressed content to the electronic display 115 for presentation. In FIG. 2, the decompression engine 130 is located on the right side 220D of the head mounted display 200. In other embodiments, the decompression engine 130 may be located on any side or any part of the head mounted display 200.

Figure 3:
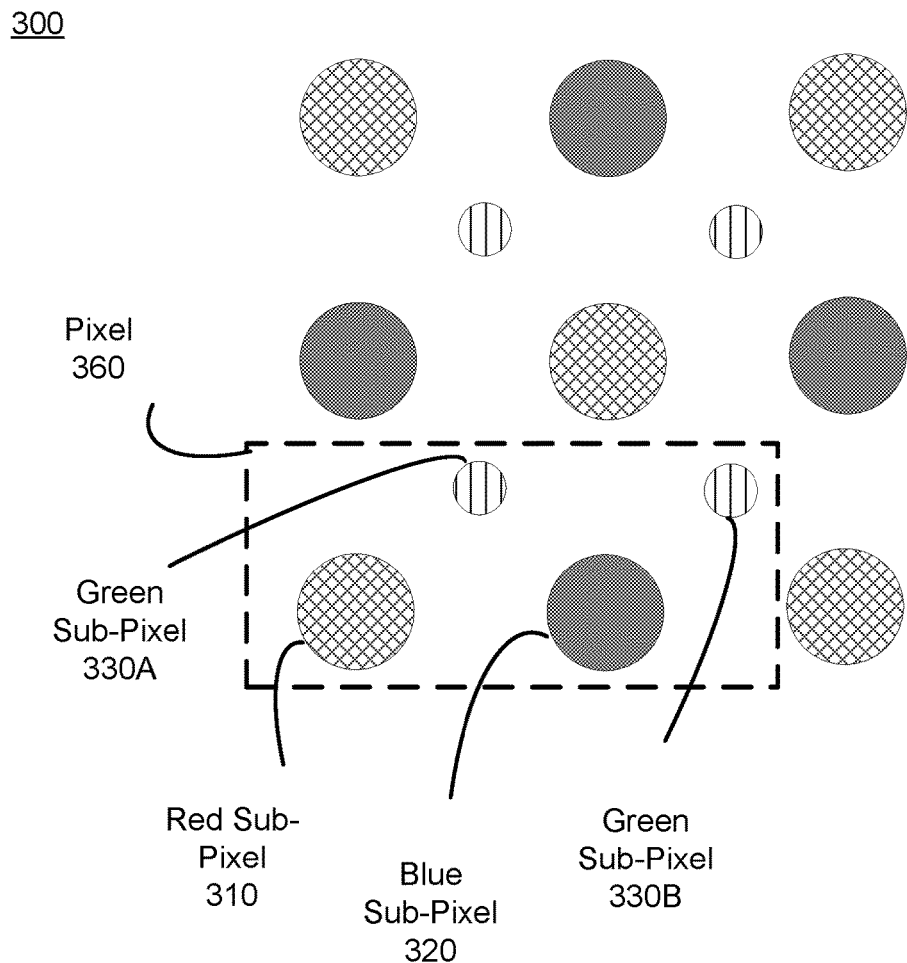
FIG. 3 is an example array of sub-pixels of an electronic display, in accordance with an embodiment.

FIG. 3 is an example array 300 of sub-pixel emission areas on an electronic display (e.g., electronic display 115). The example array 300 shown in FIG. 3 includes emission areas for red sub-pixels 310, blue sub-pixels 320, and green sub-pixels 330A, 330B (generally referred to as "a green sub-pixel 330"). Each sub-pixel emits light according to a corresponding value indicated by image data from the decompression engine 130.

In the example shown in FIG. 3, one red sub-pixel 310, one blue sub-pixel 320 and two green sub-pixels 330A and 330B form a pixel 360. In FIG. 3, a size of an emission area of each of the red sub-pixel 310 and the blue sub-pixel 320 is larger than a size of a single green sub-pixel 330. In other embodiments, a size of an emission area of each sub-pixel is different than shown in FIG. 3. In one aspect, the green sub-pixel 330A and the green sub-pixel 330B are controlled with different values, and emit different degrees of green color. Alternatively, the green sub-pixel 330A and the green sub-pixel 330B are controlled with a same value, and emit a green color of a same emission level. In other embodiments, the array 300 may include sub-pixels in different arrangements. For example, the pixel 360 may include a single green sub-pixel instead of two green sub-pixels. For another example, the red sub-pixel 310, the blue sub-pixel 320, and the green sub-pixels 330 may be arranged in a different sequence than shown in FIG. 3.

Example Data Compression

Figure 4A:
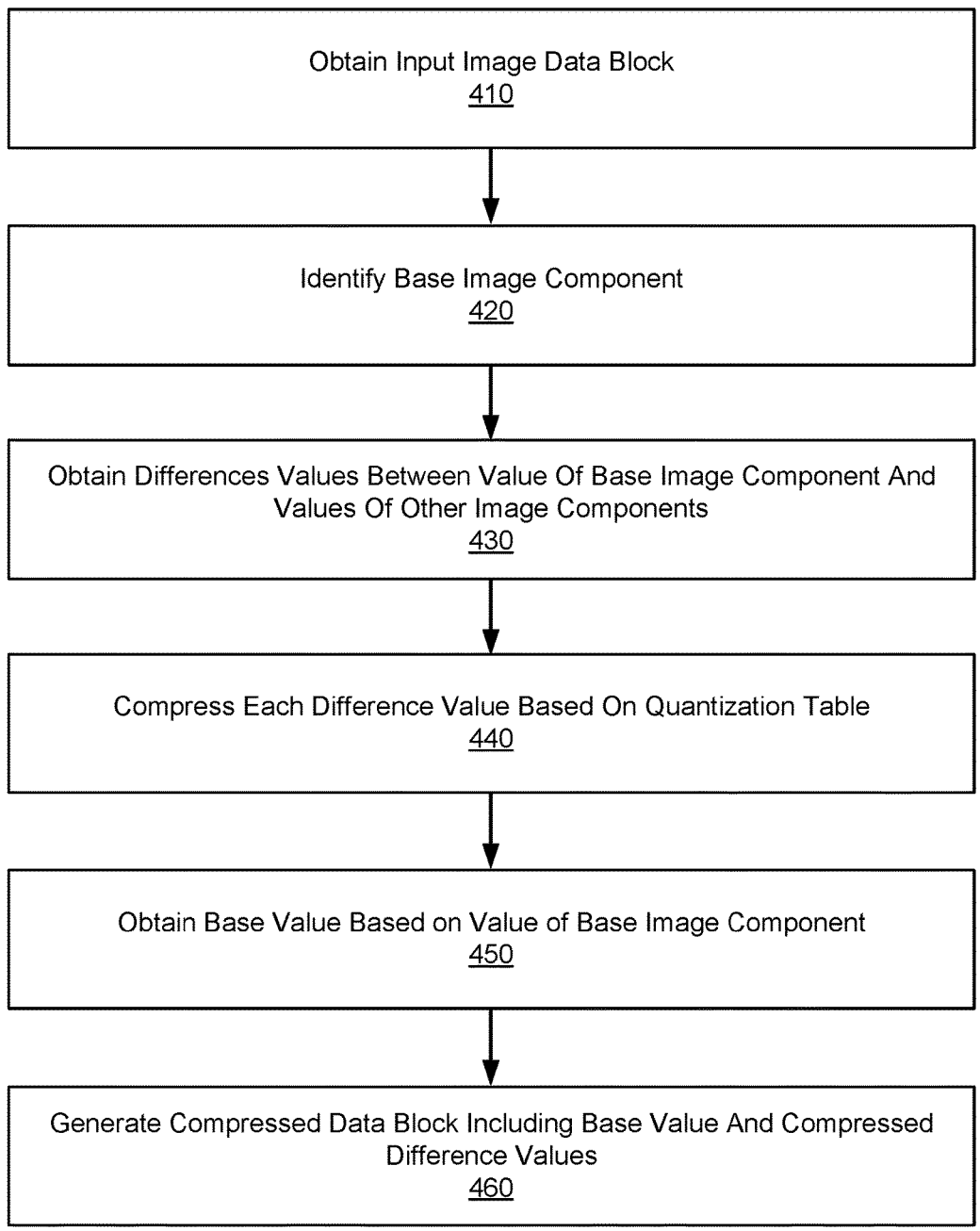
FIG. 4A is a flow chart showing a process of compressing an image data block, in accordance with an embodiment.

FIG. 4A is a flow chart showing a process of compressing an image data block, in accordance with an embodiment. In one embodiment, the steps in FIG. 4A are performed by the console 110 (e.g., compression module 160). Other entities may perform some or all of the steps of the process in other embodiments. Likewise, embodiments may include different and/or additional steps, or perform the steps in different orders.

The console 110 obtains 410 an input image data block. In one embodiment, the VR/AR engine 155 generates an image data block, where the image data block includes values of different image components. For example, the image data block includes values of a red image component corresponding to a red sub-pixel 310, a blue image component corresponding to a blue sub-pixel 320, and two green image components corresponding to two sub-pixels 330A, 330B. Each value may be represented in 8 bits with a range between 0 and 255. In one aspect, the values of the two green sub-pixels are the same, and the image data block may include a value of one green image component instead of values of two green image components. Alternatively, the values of the two green sub-pixels can be different, where each value is associated with a corresponding green sub-pixel.

The console 110 identifies 420 a base image component. The base image component herein refers to an image component to be used as a reference for performing compression or decompression. In one embodiment, the console 110 determines a first image component in the image data block as the base image component. For example, if the image data block includes values (5, 23, 11, 14) for a red image component, a first green image component, a blue image component, and a second green image component in that sequence, the console 110 determines the red image component to be the base image component, because it is the first image component of the example image data block above. In another embodiment, the console 110 determines an image component with a largest value as the base image component. In this embodiment, the console 110 determines the first green image component of the example image data block above as the base image component, because the first green image component has the largest value '23'.

The console 110 obtains 430 differences between a value of the base image component and values of other image components. Assuming for an example, the red image component is selected as the base image component in the above example image data block, the console 110 obtains a difference data block of (5, 18, 6, 9). In this example, the value of the base image component remains the same, but the remaining values are replaced with a difference value from the value (e.g., '5') of the base image component. For example, the difference between the second image component '23' and the base image component '5' is the difference value '18' (the second entry in the difference data block).

The console 110 compresses 440 each difference value based on one or more quantization tables. The quantization table includes a set of representable values. For each difference value, the console identifies a closest representable value to the difference value in the quantization table, and replaces the difference value with the identified representable value. In one aspect, each difference value or each image component is associated with a corresponding quantization table. Compression or decompression can be performed based on a corresponding quantization table.

In one embodiment, a first quantization table (herein also referred to as a "4-bit quantization table") maps 0-255 range of a difference value into 16 levels (4-bits). An example mapping may be represented as below:
static int quantizationTable[16]={0, 0x01, 0x02, 0x04, 0x08, 0x10, 0x20, 0x40, −0x01, −0x02, −0x04, −0x08, −0x10, −0x20, −0x40, −0x80},
where each value is represented in a hexadecimal notation. The value −0x80 indicates whether to flip the top bit, and is not actually a signed add, and no clamping of the result is performed. This allows this encoding (or compression) to express both +128 and −128.

In one embodiment, a second quantization table (herein also referred to as a "5-bit quantization table") maps 0-255 range of a difference value into 32 levels (5-bits). An example mapping may be represented as below:
static int quantizationTable[32]={0, 0x01, 0x02, 0x03, 0x04, 0x06, 0x08, 0x0c, 0x10, 0x18, 0x20, 0x30, 0x40, 0x60, 0x80, 0xc0, −0xe0, −0x01, −0x02, −0x03, −0x04, −0x06, −0x08, −0x0c, −0x10, −0x18, −0x20, −0x30, −0x40, −0x60, −0x80, −0xc0}, where each value is represented in the hexadecimal notation.

Assuming (for example) that a 5 bit quantization table is applied to all of the difference values in the example difference data block (5, 18, 6, 9), the console 110 obtains a compressed data block (5, 0x10, 0x06, 0x08) after compression, because '18' is closest to 0x10 (or '16'), '6' is exactly 0x06 (or '6'), and '9' is closest to 0x08 (or '8').

The console 110 obtains 450 a base value based on the value of the base image component. The base value herein refers to a reference value based on which a decompression can be performed. In one embodiment, the console 110 determines the value of the base image component to be the base value without any compression or modification. In other embodiments, the compression performed on the value of the base component is different from the compression performed on the difference values. In one example, the value of the base component represented in 8 bits is quantized to the base value represented in 7 bits.

The console 110 generates 460 a compressed data block including the base value and the compressed difference values. Values of image components other than the base image component can be obtained (for instance, by the decompression engine 130) by decompressing the compressed difference values, and adding the decompressed difference values to the base value or to a value of the base image component derived from the base value. Accordingly, the image data block of a high quality image data can be compressed into a compact format by the console 110 and transmitted to the head mounted display 105, by which the image data block can be reconstructed for presenting the high quality image.

Figure 4B:
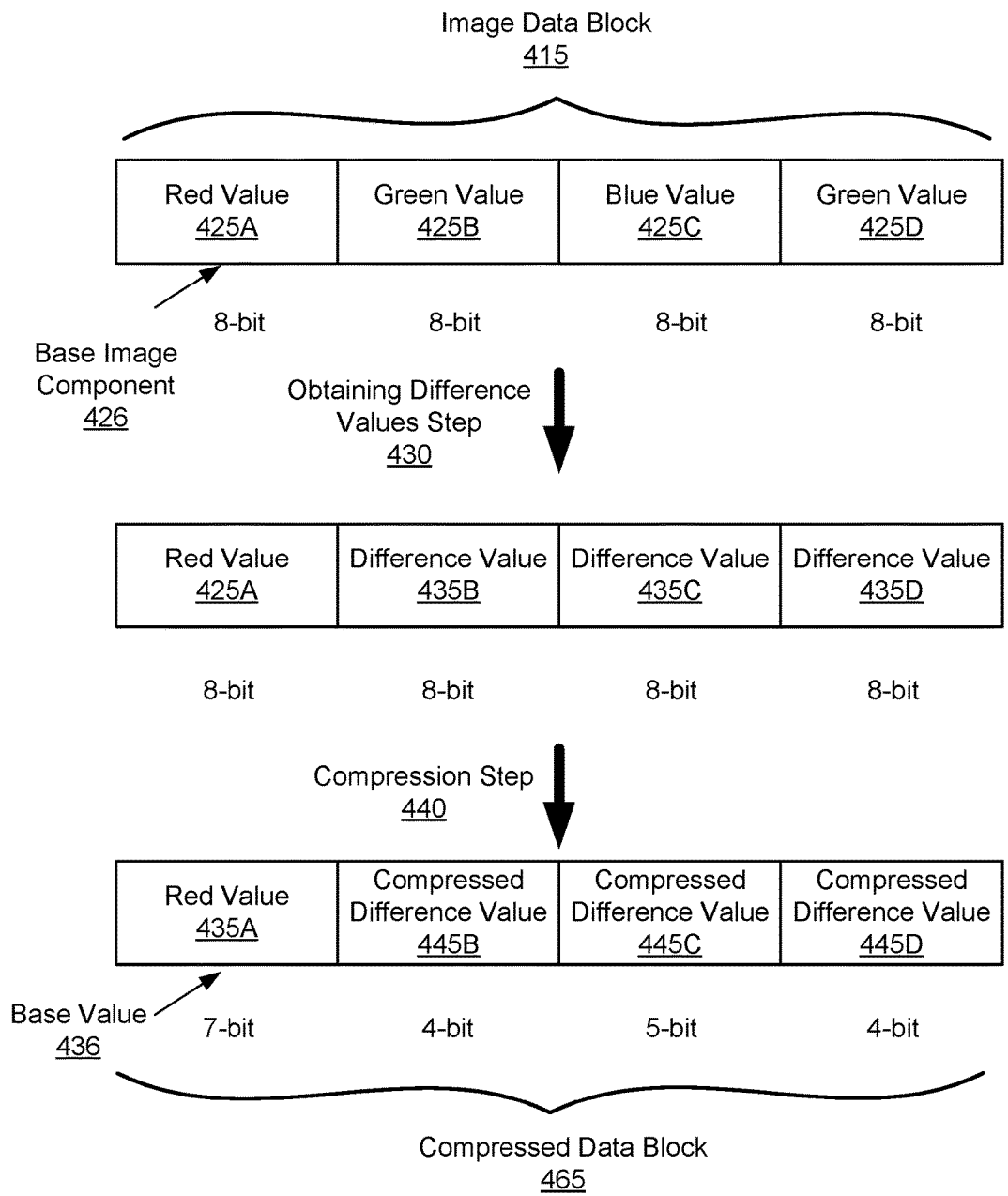
FIG. 4B is an example data block being compressed, in accordance with an embodiment.

FIG. 4B is an example data block for illustrating a compression process of FIG. 4A.

The console 110 obtains the image data block 415 including a red value 425A corresponding to a red image component, a green value 425B corresponding to a green image component, a blue value 425C corresponding to a blue image component, and a green value 425D corresponding to another green image component. In the embodiment of FIG. 4B, each image component is represented in 8 bits. In this example, the console 110 determines the red image component as a base image component 426, because the red image component is the first component of the image data block 415.

For the remaining image components other than the base image component 426, the console 110 obtains difference values (435B, 435C, 435D) between a value 425A of the base image component 426 and the values (425B, 425C, 425D) of the image components, respectively. The console 110 compresses the difference values 435B, 435C, 435D into compressed difference values 445B, 445C, 445D respectively based on corresponding quantization tables. In the example shown in FIG. 4B, the difference values 435B, 435D (8 bits each) are compressed into compressed difference values 445B and 445D (4 bits each) according to a 4-bit quantization table respectively, and the difference value 435C (8 bits) is compressed into a compressed difference value 445C (5 bits) according to a 5-bit quantization table. Additionally, the console 110 compresses the value 425A (8 bits) of the base image component 426 to obtain a base value 436 (7 bit). Thus, the image data block 415 (32 bits) is compressed into a compressed data block 465 (20 bits).

Figure 5A:
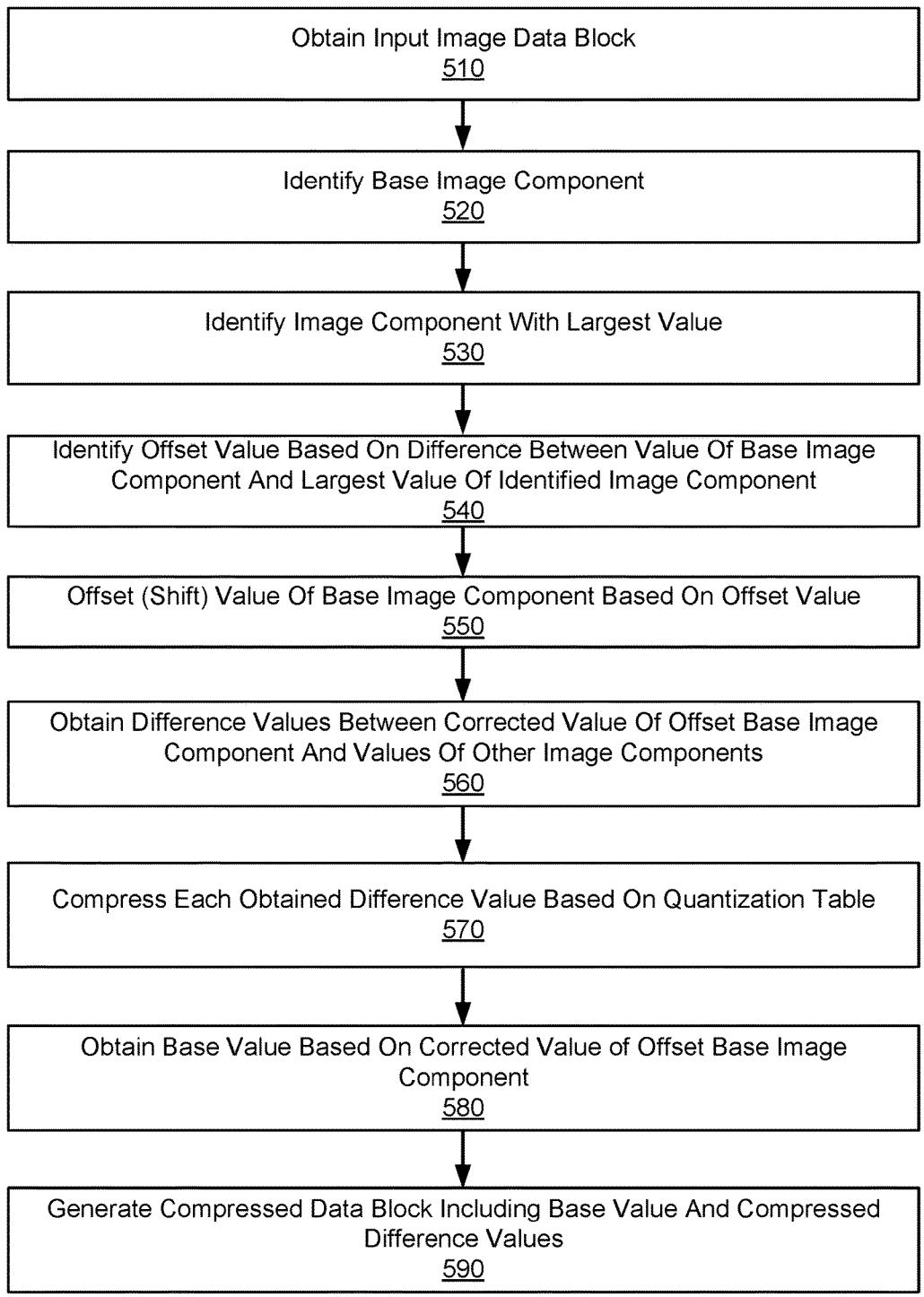
FIG. 5A is a flow chart showing a process of compressing an image data block, in accordance with another embodiment.

FIG. 5A is a flow chart showing a process of compressing an image data block, in accordance with another embodiment. In one embodiment, the steps in FIG. 5A are performed by the console 110 (e.g., compression module 160). Other entities may perform some or all of the steps of the process in other embodiments. Likewise, other embodiments may include different and/or additional steps, or perform the steps in different orders.

The console 110 obtains 510 an input image data block and identifies 520 a base image component. The steps of 510 and 520 are identical to the steps 410 and 420 of FIG. 4A. Therefore, the detailed description thereof is omitted herein for the sake of brevity.

The console 110 identifies 530 a color component with a largest value in the input image data block. In case the value of the base image component is the largest value among the values in the image data block, the console 110 may proceed to the step 430 of FIG. 4A.

The console 110 identifies 540 an offset value based on a difference between a value of the base image component and the largest value of the identified image component. In one embodiment, the console 110 determines the offset value such that the largest value can be represented without an error. For example, the input image data block with values (5, 23, 11, 14) can be compressed into (5, 0x10, 0x06, 0x08), as described above with respect to FIG. 4A. However, adding the largest difference value '16' (corresponding to '0x10') to the value of the base image component '5' becomes '21' rather than the original value '23'. In this example, the error exists due to the compression. To eliminate the error caused by compressing the largest value, the console 110 determines an offset value that can be added to the value of the base image component to remove the error. In one embodiment, the offset value is obtained as a difference between (i) the largest value and (ii) a sum of the value of the base image component and a representable difference value. In the example above, the console 110 determines that the offset value is '2', because a difference between (i) the original largest value '23' and (ii) a sum '21' of the value of the base image component '5' and a representable difference value '16' is '2'.

The console 110 shifts (or offsets) 550 the value of the base image component based on the offset value. Continuing with the above example, the console 110 adds the offset value to the value of the base image component '5' to obtain the corrected value of the offset base image component of '7'. Therefore, adding a representable difference value '16' to a corrected value of the offset base image component '7' renders an accurate largest value '23'.

The remaining steps 560, 570, 580, 590 are substantially similar to the steps 430, 440, 450, 460 of FIG. 4A, except the corrected value of the offset base image component is used instead of the value of the base image component. Therefore, the detailed description thereof is omitted herein for the sake of brevity.

By offsetting the value of the base image component such that the largest value can be represented accurately without an error, values of other image components may be represented with errors. Despite errors in values of other image components, ensuring the accuracy of the largest value of the input data block allows better color fidelity and smooth gradients of color.

Figure 5B:
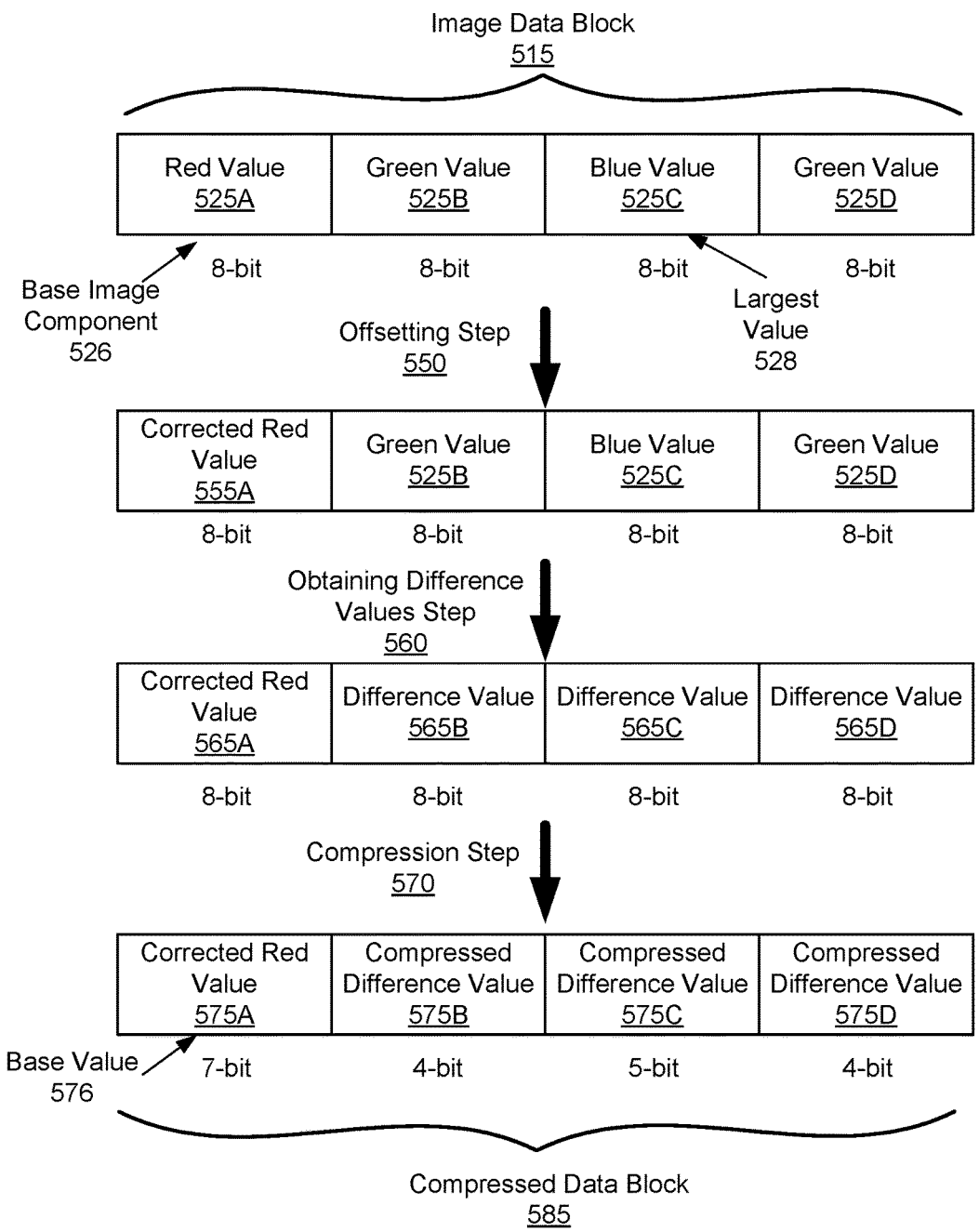
FIG. 5B is an example data block being compressed, in accordance with another embodiment.

FIG. 5B is an example data block for illustrating a compression process of FIG. 5A.

The console 110 obtains the image data block 515 including a red value 525A corresponding to a red image component, a green value 525B corresponding to a green image component, a blue value 525C corresponding to a blue image component, and a green value 525D corresponding to another green image component. Each image component may be represented in 8 bits. In this example, the console 110 determines the red image component as a base image component 526, because the red image component is the first component of the image data block 515. In addition, the console 110 determines the blue value 525C is the largest among the values 525 of the image data block 515. If the red value 525A (value of the base image component) is the largest value among the values 525A, 525B, 525C, 525D of the image data block 515, the console 110 omits the remaining steps in FIG. 5B but instead may proceed to the step 430 of FIG. 4B.

The console 110 identifies an offset value based on a difference between the red value 525A and the blue value 525C. In one embodiment, the console 110 determines a representable difference value from a corresponding quantization table, and determines a difference between (i) the blue value 525C (e.g., largest value) and (ii) the representable difference value between the red value 525A and the blue value 525C, as the offset value.

The console 110 adds the offset value to the red value 525A to obtain a corrected red value 555A. For the remaining image components other than the base image component 526, the console 110 obtains difference values (565B, 565C, 565D) between the corrected red value 565A and the values (525B, 525C, 525D) of the image component, respectively. The console 110 compresses the difference values 565B, 565C, 565D into compressed difference values 575B, 575C, 575D respectively based on the corresponding quantization tables. In the example shown in FIG. 5B, the difference values 565B, 565D (8 bits each) are compressed into compressed difference values 575B and 575D (4 bits each) respectively according to a 4-bit quantization table, and the difference value 565C (8 bits) is compressed into a compressed difference value 575C (5 bits) according to a 5-bit quantization table. Additionally, the console 110 compresses the corrected red value 565A (8 bits) to obtain a base value 576 (7 bit). Accordingly, the image data block 515 (32 bits) is compressed into a compressed data block 585 (20 bits). Because the value of the base image component 526 is shifted by the offset value, the largest value 528 can be obtained by the head mounted display 105 without substantial error.

Example Decompression

Figure 6A:
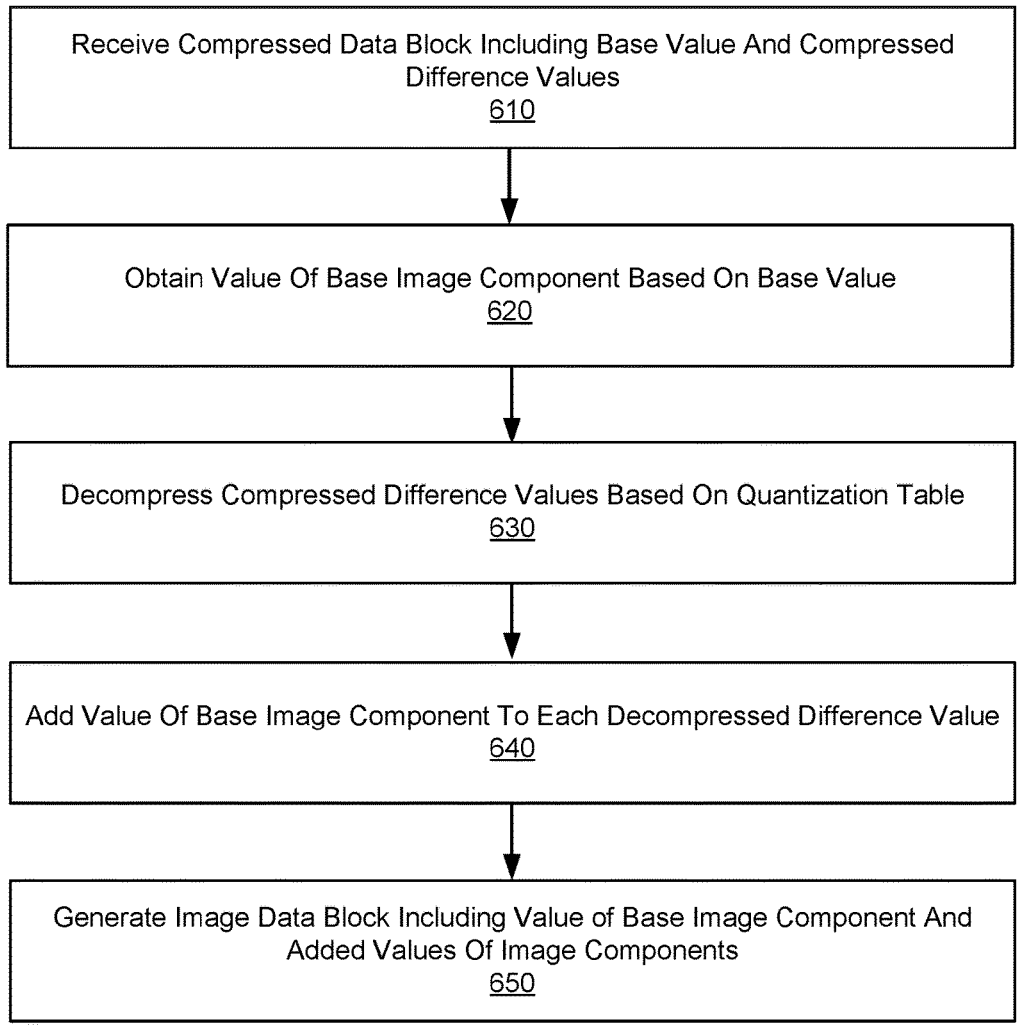
FIG. 6A is a flow chart showing a process of decompressing a compressed image data block, in accordance with another embodiment.

FIG. 6A is a flow chart showing a process of decompressing a compressed image data block, in accordance with another embodiment. In one embodiment, the steps in FIG. 6A are performed by the head mounted display 105 (e.g., decompression engine 130). Other entities may perform some or all of the steps of the process in other embodiments. Likewise, embodiments may include different and/or additional steps, or perform the steps in different orders.

The head mounted display 105 receives 610 a compressed data block including a base value and compressed difference values.

The head mounted display 105 obtains 620 a value of the base image component based on the base value. In case the base value is obtained by compressing the value of the base image component, the head mounted display 105 can decompress the base value to obtain the value of the base image component. Alternatively, the head mounted display 105 can use the base value as the value of the base image component without any conversion (or any decompression).

The head mounted display 105 decompresses 630 the compressed difference values based on the corresponding quantization tables. In one example, the head mounted display 105 identifies a decompressed difference value (e.g., '16') corresponding to the compressed difference value (e.g., 0x10) according to a mapping indicated by the corresponding quantization tables.

The head mounted display 105 adds 640 the base value to each decompressed difference value to obtain a value of a corresponding image component, and generates 650 an image data block including the value of the base image component and the values of the other image components. The image data block is provided to the electronic display 115 for presentation.

Figure 6B:
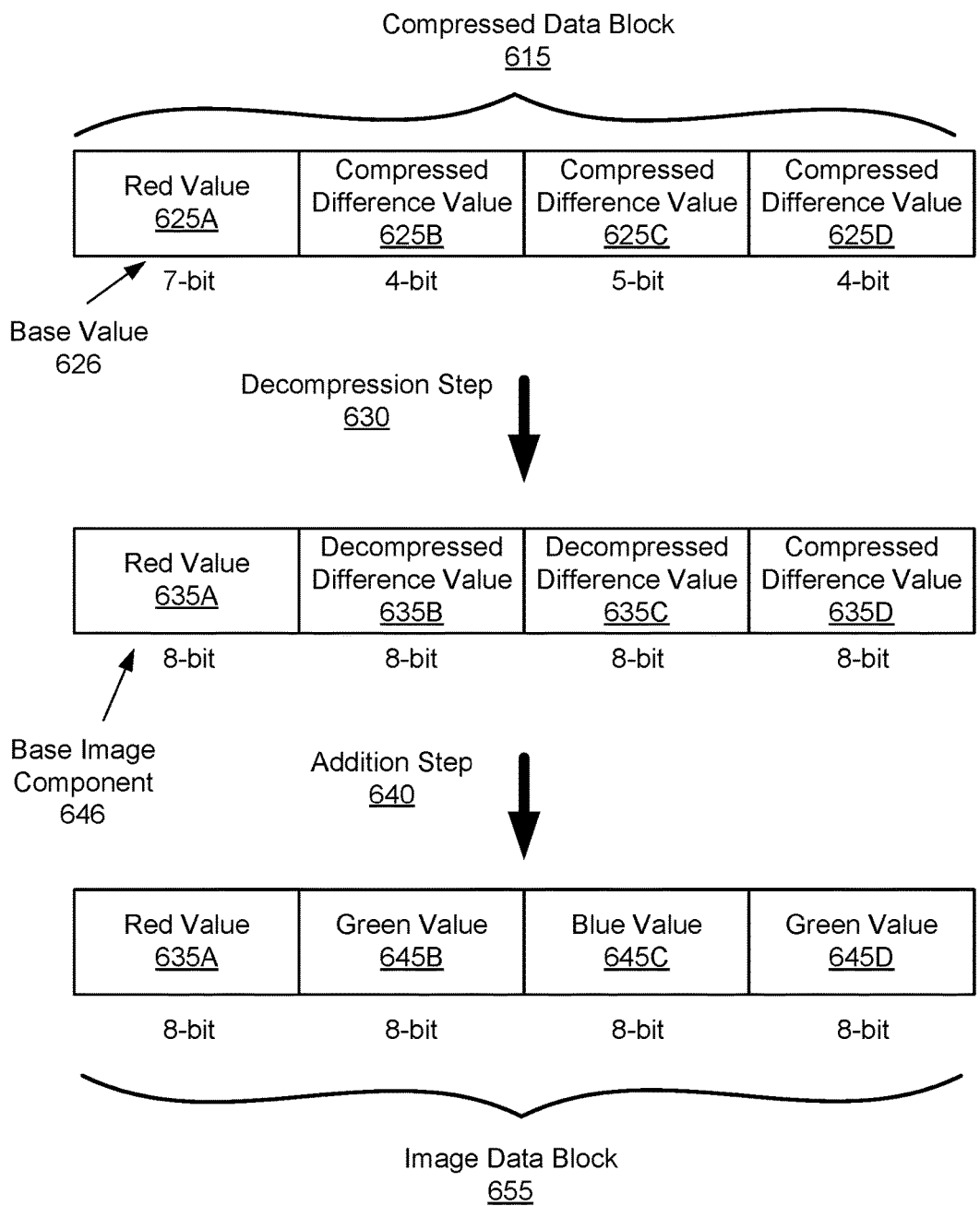
FIG. 6B is an example data block being decompressed, in accordance with another embodiment.

FIG. 6B is an example data block being decompressed, in accordance with another embodiment.

The head mounted display 105 receives the compressed data block 615 including a red value 625A corresponding to a red image component, a compressed difference value 625B corresponding to a green image component, a compressed difference value 625C corresponding to a blue image component, and a compressed difference value 625D corresponding to a green image component. In this example, the compressed data block 615 has 20 bits, and the values 625A, 625B, 625C, 625D occupy 7 bits, 4 bits, 5 bits, and 4 bits, respectively. In one approach, the head mounted display 105 determines that the red value 625A is the base value 626, because the red value 625A is the first value of the compressed data block 615.

The head mounted display 105 decompresses the values 625 of the compressed data block 615. Specifically, the head mounted display 105 obtains decompressed difference values 635B, 635C, 635D, according to the compressed difference values 625B, 625C, 625D and the mapping indicated in the corresponding quantization tables. The head mounted display 105 also decompresses the red value 625A represented in 7 bits into a decompressed red value 635A in 8 bits, and determines the decompressed red value 635A as a value of the base image component 646. In other embodiments, the head mounted display 105 may omit the decompression of the red value 625A (or the base value 626), and determines the red value 625A (or the base value 626) as a value of the base image component 646. Moreover, the head mounted display 105 obtains values 645B, 645C, 645D of other image components by adding the value of the base image component 646 to the difference values 635B, 635C, 635D, respectively. The head mounted display 105 generates the image data block 655 including the red value 635A, green value 645B, blue value 645C, and green value 645D, and presents an output image to a user according to the image data block 655.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display headset comprising:
   an electronic display including pixels configured to display image data according to an output image data block, the output image data block comprising a first output value of a first image component and a second output value of a second image component; and
   a decompression engine communicatively coupled to the electronic display, the decompression engine configured to:
      receive a compressed data block, the compressed data block including a base value and a first compressed difference value representative of a first input value and a second input value, wherein the compressed data block is compressed by 1) obtaining an offset value based on the first input value and a largest value corresponding to an image component of an input image data block, 2) shifting the first input value based on the offset value to produce a shifted input image data block, and 3) compressing the shifted input image data block to produce the compressed data block,
      obtain the first output value of the first image component based on the base value,
      decompress the first compressed difference value using a value of a quantization table closest to a difference value that, when compressed, is equal to the first compressed difference value,
      obtain the second output value of the second image component by adding the first decompressed difference value to the first output value, and
      generate the output image data block comprising the first output value of the first image component and the second output value of the second image component.

2. The display headset of claim 1, further comprising:
   a position sensor for detecting a movement of the display headset, wherein the compressed data block is generated based on the movement detected by the position sensor.

3. The display headset of claim 1, wherein the output image data block further comprises a third output value of a third image component and a fourth output value of a fourth image component, wherein the compressed data block further comprises a second compressed difference value corresponding to the third image component and a third compressed difference value corresponding to the fourth image component.

4. The display headset of claim 3, wherein the decompression engine is further configured to:
   decompress the second compressed difference value based on another quantization table different from the quantization table, and
   decompress the third compressed difference value based on the quantization table.

5. The display headset of claim 4, wherein the decompression engine is further configured to:
   obtain the third output value of the third image component by adding the second decompressed difference value to the first output value, and obtain the fourth output value of the fourth image component by adding the third decompressed difference value to the first output value.

6. The display headset of claim 3, wherein the first image component is a red sub-pixel, the second image component is a first green sub-pixel, the third image component is a blue sub-pixel, and the fourth image component is a second green sub-pixel.

7. The display headset of claim 6, wherein the second output value and the fourth output value are identical.

8. The display headset of claim 3, wherein the decompression engine is configured to obtain the first output value by:
    decompressing the base value into the first output value, the first output value and the first decompressed difference value obtained using different decompression processes.

9. A system comprising:
    a console configured to:
        generate an input image, the input image comprising an input image data block, the input image data block comprising a first input value of a first image component and a second input value of a second image component, and
        compress the input image data block into a compressed data block by:
            computing a base value and a first compressed difference value representative of the first input value and the second input value;
            obtaining an offset value based on the first input value and a largest value corresponding to an image component of the input image data block;
            shifting the first input value based on the offset value to produce a shifted input image data block; and
            compressing the shifted input image data block to produce the compressed data block; and
    a display headset comprising:
        a decompression engine, the decompression engine configured to:
            receive the compressed data block,
            obtain a first output value of the first image component based on the base value,
            decompress the first compressed difference value using a value of a quantization table closest to a difference value that, when compressed, is equal to the first compressed difference value,
            obtain a second output value of the second image component by adding the first decompressed difference value to the first output value, and
            generate an output image data block comprising the first output value of the first image component and the second output value of the second image component, and
        an electronic display coupled to the decompression engine, the electronic display including pixels configured to display an output image according to the output image data block from the decompression engine.

10. The system of claim 9, wherein the display headset further comprises:
    a position sensor for detecting a movement of the display headset, wherein the console is further configured to generate the input image based on the movement detected by the position sensor.

11. The system of claim 9, wherein the output image data block further comprises a third output value of a third image component and a fourth output value of a fourth image component, wherein the compressed data block further comprises a second compressed difference value corresponding to the third image component and a third compressed difference value corresponding to the fourth image component.

12. The system of claim 11, wherein the first image component is a red sub-pixel, the second image component is a first green sub-pixel, the third image component is a blue sub-pixel, and the fourth image component is a second green sub-pixel.

13. The system of claim 12, wherein the second output value and the fourth output value are identical.

14. The system of claim 9, wherein the console compresses the input image data block by:
    obtaining a first difference value, the first difference value being a difference between the first input value of the first image component and the second input value of the second image component;
    obtaining the base value based on the value of the first image component;
    compressing the first difference value into the first compressed difference value based on the quantization table; and
    generating the compressed data block comprising the base value and the first compressed difference value.

15. The system of claim 14, wherein the console compresses the first difference value into the first compressed difference value based on the quantization table by:
    identifying a first representable difference value from a set of values in the quantization table closest to the first difference value;
    replacing the first difference value with the first representable difference value, the first representable difference value having a fewer number of bits than the first difference value; and
    compressing the first representable difference value into the first compressed difference value.

16. The system of claim 9, wherein the input image data block further comprises a third input value of a third image component and a fourth input value of a fourth image component, wherein the compressed data block further comprises a second compressed difference value corresponding to the third image component and a third compressed difference value corresponding to the fourth image component.

17. The system of claim 16, wherein the console compresses the input image data block by:
    obtaining a first difference value, the first difference value being a difference between the shifted first input value and the second input value;
    obtaining a second difference value, the second difference value being a difference between the shifted first input value and the third input value; and
    obtaining a third difference value, the third difference value being a difference between the shifted first input value and the fourth input value.

18. The system of claim 17, wherein the console compresses the input image data block by:
    obtaining the base value according to the shifted first input value;
    compressing the first difference value into the first compressed difference value based on the quantization table;
    compressing the second difference value into the second compressed difference value based on another quantization table;

compressing the third difference value into the third compressed difference value based on the quantization table; and generating the compressed data block comprising the base value, the first compressed difference value, the second compressed difference value and the third compressed difference value.

19. An integrated circuit decoder configured to:

receive a compressed image data block comprising a base value corresponding to a first image component and a first compressed difference value corresponding to a second image component and representative of a first input value and a second input value, wherein the compressed image data block is compressed by 1) obtaining an offset value based on the first input value and a largest value corresponding to an image component of an input image data block, 2) shifting the first input value based on the offset value to produce a shifted input image data block, and 3) compressing the shifted input image data block to produce the compressed image data block;

generate a first output value corresponding to the first image component based on the base value;

decompress the first compressed difference value using a value of a quantization table closest to a difference value that, when compressed, is equal to the first compressed difference value to obtain a decompressed difference value;

generate a second output value corresponding to the second image component by adding the decompressed difference value to the first output value;

generate an output image data block comprising the first output value of the first image component and the second output value of the second image component; and provide the output image data block to a display including pixels and configured to display an output image based on the output image data block.

20. The integrated circuit decoder of claim 19, wherein the display comprises a wearable display headset.

21. A method comprising:

receiving a compressed image data block comprising a base value corresponding to a first image component and a first compressed difference value corresponding to a second image component and representative of a first input value and a second input value, wherein the compressed image data block is compressed by 1) obtaining an offset value based on the first input value and a largest value corresponding to an image component of an input image data block, 2) shifting the first input value based on the offset value to produce a shifted input image data block, and 3) compressing the shifted input image data block to produce the compressed image data block;

generating a first output value corresponding to the first image component based on the base value;

decompressing the first compressed difference value using a value of a quantization table closest to a difference value that, when compressed, is equal to the first compressed difference value to obtain a decompressed difference value;

generating a second output value corresponding to the second image component by adding the decompressed difference value to the first output value;

generating an output image data block comprising the first output value of the first image component and the second output value of the second image component; and providing the output image data block to a display including pixels and configured to display an output image based on the output image data block.

* * * * *